3,737,525
METHOD FOR CAUSING HEPATITIS IN ANIMALS
Dietrich Keppler, Rainer Lesch, Werner Reutter, and Karl Decker, Freiburg, Germany, assignors to Carl Roth oHG, Karlsruhe, Germany
No Drawing. Filed Sept. 29, 1969, Ser. No. 861,988
Int. Cl. A61k 27/00
U.S. Cl. 424—180                                  2 Claims

ABSTRACT OF THE DISCLOSURE

The administration of D-galactosamine·HCl is found to cause hepatitis in animals. The use thereof in this manner makes it possible to test the therapeutic possibilities of various drugs against human virus hepatitis as well as to research pathogensis and metabolic changes.

BACKGROUND OF THE INVENTION

This invention relates to the use of a chemical compound to cause hepatitis in animals. The novel procedure of the invention serves, in the pharmaceutical industry, for testing the therapeutic possibilities for combating human virus hepatitis in animal experiments, as well as for the rearch of pathogenesis and metabolic changes.

The artificial causation of liver inflammations in animals is conventional. This can be effected, for example, by the administration of doses of carbon tetrachloride. However, this procedure has the disadvantage that a genuine poisoning of the animal liver with irreversible damages occurs as an unavoidable consequence, making the testing of drugs extremely more difficult.

Artificially invoked hepatitis in animals, caused by injections of serum from human patients or by inoculation of H–1 viruses cultured in vitro, differs substantially from human hepatitis because of the occurrence of giant cells in the cellular tissue of the treated animal livers. These giant cells make the conducting of animal experiments difficult because they are morphologically different.

Accordingly, one of the objects of the present invention is to provide an improved procedure for causing hepatitis in animals which makes it readily convenient and effective for testing the therapeutic effectiveness of various drugs against human virus hepatitis, while overcoming the disadvantages and deficiencies of the prior art procedures.

Another object of the present invention is to provide a way for causing artificial inflammation of the liver (hepatitis) in animals, which entails no undesired side effects.

A further object of the invention is to provide a procedure employing the use of a particular chemical compound for causing hepatitis in animals wherein the inflammatory symptoms thereof are completely regressive upon discontinuing the use of said compound.

These and other objects and advantages of the present invention will become apparent to those skilled in the art from a consideration of the following specification and claims.

SUMMARY OF THE INVENTION

In accordance with the present invention, the above objectives are met by administering D-galactosamine·HCl (the hydrochloride salt of chondrosamine) to the animals.

Proceeding in accordance with the invention, it was discovered that it is possible to cause changes of the liver exhibiting a great similarity to the so-called human viral hepatitis in animal species, such as the rat, as well as in guinea pigs, rabbits, and monkeys by the administration of doses of galactosamine hydrochloride. After discontinuing the administration thereof, a complete restitution of the animal liver takes place within a few days. Because of the great similarity to the so-called human viral hepatitis, the liver inflammation induced by the administration of D-galactosamine·HCl is eminently suitable for use as a model for studying biological and pathological questions. The changes produced in the liver are dependent on the dosage and can be reproduced without any exception whatsoever.

D-galactosamine·HCl can be easily handled because, in contrast to the virus experiments, its ultization is harmless to the research worker. Therefore, the invention can be advantageously employed on a large scale in chemical industrial plants in animal tests for the testing of newly developed drugs and pharmaceuticals. Moreover, as compared to the previously known and used methods, a considerable saving in expenses can be expected.

As is known in the art, D-galactosamine·HCl is a sugar compound having the following structural formula:

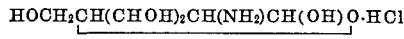

D-galactosamine·HCl has the empirical formula:

Its molecular weight is 215.64. As noted above, this compound is also known as D-chondrosamine hydrochloride. It is present in the human metabolism and can be synthesized without difficulties. Heretofore, galactosamine hydrochloride has been employed merely for the purposes of chromatography and for studies on microorganisms.

Hence, the utilization of D-galactosamine·HCl for causing hepatitis is completely novel, and the results obtained by the use thereof are surprising and could not be predicted by one skilled in the art. This conclusion is substantiated by the fact that equimolar amounts, per kilogram of body weight, of related compounds, such as N-acetyl-D-glactosamine, D-glucosamine, N-acetyl-D-glucosamine, D-mannosamine, D-galactose, 2-deoxy-D-galactose, D-galactitol and L-fucose, do not evoke the observed liver changes.

Preferably, the compound used in the present invention is administered to the animals in a total weight of 200–1500 milligrams of D-galactosamine·HCl per kilogram of body weight. Smaller quantities cause different symptoms, but not the desired ones, and larger amounts have a toxic effect.

Advantageously, in a preferred embodiment of the invention, galactosamine hydrochloride is administered to the animals in six individual dosages intraperitoneally or intravenously within a period of 30 hours. Such an application is especially advantageous because the intraperitoneal injection, in parrticular, can be readily executed in animal experiments because of its simplicity and ease of manipulation. In order to be administered, the D-galactosamine·HCl is preferably dissolved in a neutral (pH of about 7) 0.45-molar aqueous solution thereof. This degree of solution proved to be suitable because the osmolality is in a favorable range and because volumes are available for injection.

A total amount of 200–1500 milligrams of D-galactosamine·HCl per kilogram of body weight can also be administered, repsectively, once per day within a period of at least three months. This dosage produces in the animals chronic damages similar to cirrhosis of the liver which makes it possible to study and research the pathogenesis and the possibilities for combating these symptoms, the cause of which is not known with certainty.

EXAMPLES OF THE INVENTION

The following exemplary effects are observed on the livers of animals when applying D-galactosamine·HCl in accordance with this invention. These results are given merely as illustrative of the invention and are not to be considered as limiting.

Within just 26 hours after the first administration of D-galactosamine·HCl, bilirubin, transaminases [GOT (glutamic-oxalacetic transaminase) and GPT (glutamic-pyruvic transaminase)], glutamate dehydrogenase and sorbitol dehydrogenase are found to be strongly increased in the serum. The protein content drops to 80% of the norm. Especially pronounced is the drop in prothrombin (coagulation factor II). The Quick value (the Quick test is conducted by adding an extrinsic thromboplastin such as dried rabbit brain and calcium to oxalated blood in order to define the integrity of the prothrombin complex, composed of factors II, V, VII and X) rises from 14.75 to 96 seconds, and the prothrombin time is increased from 17.25 to 35.5 seconds.

It is found that the glycogen content in the liver (according to Frierstopp) is reduced to 3% of the norm, and the concentrations of free glucose, glucose 6-phosphate and uridine diphosphate glucose are each decreased to 44%. The lactate/pyruvate quotient (10.1±3.9) and the ATP/ADP quotient (adenosine triphosphate/adenosine diphosphate quotient) of 2.96±0.66 remain within the normal range, whereas the sum of the adenine nucleotides decreases from 3.23 $\mu$mole/gram to 2.23 $\mu$mole/gram.

From the viewpoint of histology, inflammatory changes of the periportal regions, as well as of the parenchyma, can be observed. In the parenchyma, individual cell necroses and group necroses with Councilman bodies are found. The Kupffer's star-shaped cells (stellate cells) and the mitoses are increased in number. In contrast thereto, no adiposis can be detected.

The invention being thus described, it will be obvious that the same may be varied in many ways. Such variations are not to be regarded as a departure from the spirit and scope of the invention, and all such modifications as would be obvious to one skilled in the art are intended to be included herein.

It is claimed:
1. A method for causing hepatitis in rats, guinea pigs, rabbits or monkeys which comprises intraperitoneally or intravenously administering to said rats, guinea pigs, rabbits, or monkeys a total dosage of about 200–1500 milligrams of D-galactosamine·HCl per kilogram of body weight.
2. The method of claim 1, wherein the dosage of D-galactosamine·HCl is administered once a day over a time period of at least three months.

References Cited

Reutter et al., Natur Wissen Schaften 1968, 55 (10), p. 497.

The Merck Manual, eleventh edition, 1966, pp. 919–923.

Chemical Abstracts 55:2898 f.g.h. (1961).

ALBERT T. MEYERS, Primary Examiner

V. D. TURNER, Assistant Examiner